Patented Aug. 20, 1935

2,011,726

UNITED STATES PATENT OFFICE 2,011,726

TREATMENT OF TEXTILE FIBERS AND FABRICS MADE THEREFROM

Oscar F. Muller, Glen Ridge, N. J.

No Drawing. Application June 29, 1934,
Serial No. 732,997

5 Claims. (Cl. 91—68)

This invention relates to improvements in the treatment of textile fibers and fabrics made therefrom and relates more especially to methods for improving and increasing the tensile strength of natural silk or rayon fibers, although I do not wish to limit myself specifically to the treatment of these particular fibers.

A special purpose of my invention is the provision of an improved treatment for silk fibers after the degumming thereof, so that there is substituted on the silk fiber a material which restores and actually increases its tensile strength, which has been lost as a result of the degumming process.

A further object of this invention is the provision of a new method of treating silk or rayon fibers or the like with a material which will not alter the appearance thereof, which will withstand washing with warm water and soap, and which is easy of application.

One embodiment of my method for increasing the strength of textile fibers is as follows:—

I prefer to use a thermo-plastic resin having a basis of rubber, such as a compound of rubber with chlorostannic acid, which softens at temperatures between 50° C. and 75° C., which are resistant to acids and alkalies, which are waterproof and unaffected by treatment with warm water and soap.

For this purpose a 2% to 5% solution of thermo-plastic rubber material is used, the rubber compound being soluble in solvents of the gasoline or benzene type.

The silk fabric is dipped at room temperature in such a solution and the excess of liquid is squeezed from the fabric or hydro-extracted, and where a fabric is used in the form of a finished product such as a stocking, it is desirable to dry the stocking on slightly heated forms until the remainder of the solvent has completely evaporated.

I find that by this treatment the tensile strength of the fabric has increased from 25% to 75%, depending on the amount of resin used, and that the fabric may be repeatedly washed with warm water and soap without losing this added tensile strength.

It is desirable after the application of the thermo-plastic resin to the fibers that the original finish and feel of the fiber be restored by washing in a lukewarm olive oil soap solution or by treatment with any other well known lubricant or softener for textile fibers.

Instead of a compound of rubber with chlorostannic acid I can readily employ other compounds of rubber made with antimony pentachloride, ferric chloride, and the like, and I can use other thermo-plastic resins having properties analogous to those of the specific example above given.

By this treatment any loss of strength occasioned in the silk fiber by the degumming process is more than restored and a fiber of improved tensile strength of long wearing quality is obtained.

Having fully described my invention what I claim is:—

1. A degummed or artificial silk fiber treated with a solution of the reaction product of rubber with chlorostannic acid.

1. A degummed or artificial silk fiber coated with a solution of the reaction product of rubber with chlorostannic acid.

3. A degummed or artificial silk fiber treated with a solution of the reaction product of rubber and a halide of amphoteric metals.

4. A degummed or artificial silk fiber treated with a solution of the reaction product of rubber with a halide of an amphoteric metal and resistant to treatment with warm water and soap.

5. A degummed or artificial silk fiber coated with a solution of the reaction product of rubber with a halide of an amphoteric metal.

OSCAR F. MULLER.